(12) United States Patent
Mathur et al.

(10) Patent No.: US 10,679,133 B1
(45) Date of Patent: Jun. 9, 2020

(54) CONSTRUCTING AND UTILIZING A KNOWLEDGE GRAPH FOR INFORMATION TECHNOLOGY INFRASTRUCTURE

(71) Applicant: Peritus.AI, Inc., Palo Alto, CA (US)

(72) Inventors: Vipul Mathur, Karnataka (IN); Mohan Reddy, Fremont, CA (US); Amin Mousavi, Cupertino, CA (US); Goutham Shantigodu Tholpadi, Karnataka (IN); Karthik Gooli, Karnataka (IN); Prakash Jagatheesan, Cupertino, CA (US)

(73) Assignee: PERITUS.AI, INC., Palo Alto, CA (US)

( * ) Notice: Subject to any disclaimer, the term of this patent is extended or adjusted under 35 U.S.C. 154(b) by 0 days.

(21) Appl. No.: 16/529,484

(22) Filed: Aug. 1, 2019

(30) Foreign Application Priority Data

Jun. 7, 2019 (IN) .............................. 201941022603

(51) Int. Cl.
*G06N 5/02* (2006.01)
*G06N 20/00* (2019.01)

(52) U.S. Cl.
CPC ................ *G06N 5/02* (2013.01); *G06N 20/00* (2019.01)

(58) Field of Classification Search
CPC .................................. G06N 5/02; G06N 20/00
See application file for complete search history.

(56) References Cited

U.S. PATENT DOCUMENTS

| 8,473,325 | B2 * | 6/2013 | Barnhill, Jr. | ........ | H04L 12/2809 705/7.29 |
| 2011/0055699 | A1 * | 3/2011 | Li | ........................ | G06F 16/951 715/709 |
| 2018/0167467 | A1 * | 6/2018 | Chen | ...................... | H04L 67/36 |

OTHER PUBLICATIONS

Yang, Shuo, et al. "Efficiently answering technical questions—a knowledge graph approach." Thirty-First AAAI Conference on Artificial Intelligence. 2017. (Year: 2017).*
Zheng et al., "Question Answering Over Knowledge Graphs: Question Understanding Via Template Decomposition", Proceedings of the VLDB Endowment, vol. 11, No. 11, dated 2018, 14 pages.
Yang et al., "Efficiently Answering Technical Questions—A Knowledge Graph Approach", Proceedings of the Thirty-First AAAI Conference on Artificial Intelligence, dated 2017, 8 pages.
Leskovec, Jure, "WWW-18 Tutorial Representation Learning on Networks", http://snap.stanford.edu/proj/embeddings-www/, last viewed on Mar. 22, 2019, 2 pages.

* cited by examiner

*Primary Examiner* — Eric Nilsson
(74) *Attorney, Agent, or Firm* — Hickman Palermo Becker Bingham LLP (57) ABSTRACT

A system operation management server computer (server) and related methods are disclosed. The server is programmed to learn the features of and relations among computer devices from various types of data related to the computer devices and build a knowledge graph (KG) to represent IT infrastructure. The server is also programmed to manage a collection of issue resolution rules each mapping the states of certain computer devices that characterize a known issue and a known resolution of the known issue. In response to receiving a support bundle that contains data related to a target computer system that has encountered an unknown issue the server is programmed to determine which issue resolution rules are applicable to the support bundle based on the KG and transmit a recommendation for resolving the unknown issue.

20 Claims, 6 Drawing Sheets

```
rule "rule5: proactive case, 5th case"
when
    $execute: Map(this != null, this["rule5"] != null)                                                              — 402
    $map1: Map(this != null, this["platform"] != null, this["platform"].contains("HDX")) || Map(this != null,       — 404
    this["platform"] != null, this["platform"].contains("Appliance"))
    $map2: Map(this != null, this["adapter"] != null, this["adapter"].contains("10GbE"))                            — 406
    $map3: Map(this != null, this["version"] != null)
    $map4: Map(this != null, this["bundleName"] != null)
    $map5: Map(this != null, this["featureName"] != null, this["featureName"].contains("SSL"))
    $map6: Map(this != null, this["featureName"] != null, this["featureName"].contains("HTTP2"))                    — 408
    $map7: Map(this != null, this["featureName"] != null, this["featureName"].contains("SEC"))
    $map8: Map(this != null, this["featureName"] != null, this["featureName"].contains("IPv6"))
    $map9: Map(this != null, this["build"] != null)
    $answermap: Map(this != null, this["answer"] != null)
    $rule_monitor: Map(this != null, this["rule_monitor"] != null)
then
    if (!$rule_monitor.containsKey("BUG-1234") && $execute.get("rule5").toString().equals("enabled")) {
        retract($execute);                                                                                          — 412
        $rule_monitor.put("BUG-1234", "1");                                           — 410
        if (rulesService.compareVersion($map3.get("version").toString(), $map9.get("build").toString(), "2.1",
"5.24").equals("equal")) {
            if (!rulesService.isBugPresentInAnswer($answermap, "BUG-1234")) {
                KnownCase kc = new KnownCase();                   — 414
                kc.setBugId("BUG-1234");                                                      — 416
                kc.setSuggestedResolution("Recommendation/Resolution: Upgrade to 2.1.6+");
                ((ArrayList<KnownCase>)$answermap.get("answer")).add(kc);
            }
        }
    }
end
```

FIG. 5

502 Receive an initial hierarchy for a plurality of device classes and

504 Receive device data regarding the plurality of device classes

506 Create a knowledge graph having a set of nodes and a set of edges based on the device data, each of the set of nodes representing one of the plurality of device classes, at least one of the set of nodes having one or more attributes, including an attribute whose value is determined at run time, each of the set of edges connecting two of the set of nodes representing one of a plurality types of relations, including a first type indicating a coupling between two device classes represented by the two nodes, a second type indicating that the two device classes are variants of each other, and a third type indicating that one of the two device classes as a child class belongs to the other of the device classes as a parent class 508 Obtain rule data related to a plurality of issue resolution rules, each of the plurality of issue resolution rules mapping at least one device state corresponding to a known issue to a known resolution of the known issue, each of the at least one device state being associated with one of the one or more attributes of one of the plurality of device classes 510 Receive a new support bundle for a computer system that has encountered an unknown issue, the computer system comprising a plurality of interoperating computer devices in the plurality of device classes 512 Identify a specific issue resolution rule of the plurality of issue resolution rules that is applicable to the support bundle based on the knowledge graph 514 Transmit a recommendation in response to the support bundle based on the resolution in the specific issue resolution rule to remedy the unknown issue

FIG. 6

CONSTRUCTING AND UTILIZING A KNOWLEDGE GRAPH FOR INFORMATION TECHNOLOGY INFRASTRUCTURE

RELATED APPLICATIONS

This application claims priority under 35 U.S.C. 119(a)-(d) to Foreign Application No. 201941022603 filed in India entitled "CONSTRUCTING AND UTILIZING A KNOWLEDGE GRAPH FOR INFORMATION TECHNOLOGY INFRASTRUCTURE" and filed on Jun. 7, 2019, by Peritus.AI, Inc., which is herein incorporated in its entirely by reference for all purposes.

FIELD OF THE DISCLOSURE

One technical field of the present disclosure is system operational management. Another technical field is computer-implemented learning of features of and relations among computer devices from technical documentation and analysis of logs to resolve operational issues in information technology infrastructure.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, computers play an integral role in our lives. Many types of computer devices are available that may interoperate in different manners. Therefore, the information technology (IT) infrastructure corresponding to a computer system comprising a collection of such computer devices can be rather complex. One consequence is that when the computer system encounters an unknown issue and stops normal operation, it can be difficult to determine the root cause of the unknown issue and resolve the unknown issue based on knowledge of the root cause. In addition, the data related to the state of the computer system when the unknown issue is encountered may not capture all details concerning the unknown issue, which may make diagnosing the unknown issue even more challenging.

BRIEF DESCRIPTION OF THE DRAWINGS

In the drawings:

FIG. 4 illustrates an example issue resolution rule.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. GENERAL OVERVIEW
2. EXAMPLE COMPUTING ENVIRONMENT
3. EXAMPLE COMPUTER COMPONENTS
4. FUNCTIONAL DESCRIPTIONS
   4.1. BUILDING A KNOWLEDGE GRAPH
   4.2. ACCESSING ISSUE RESOLUTION RULES
   4.3. ANALYZING NEW SUPPORT BUNDLES
5. EXAMPLE PROCESSES
6. HARDWARE IMPLEMENTATION

1. General Overview

A system operation management server computer (server) and related methods are disclosed. The server is programmed to learn the features of and relations among types or classes of computer devices (device classes) from various types of relevant data and build a knowledge graph (KG) to represent IT infrastructure. The server is also programmed to manage a collection of issue resolution rules each mapping the states of certain device classes that characterize a known issue and a known resolution of the known issue. In response to receiving a support bundle that contains data related to a target computer system that has encountered an unknown issue the server is programmed to determine which issue resolution rules are applicable to the support bundle based on the KG and transmit a recommendation for resolving the unknown issue.

In some embodiments, the server is programmed to collect technical data indicating the features of and relations among a group of device classes from a variety of data sources, such as official data from vendor websites or additional use case studies or reviews from other systems. The server is programmed to construct a KG from the technical data, where each node represents a device class and each edge connecting two nodes represents a relation between the two device classes represented by the two nodes. For example, a first node could represent a router, a second node could represent a load balancer, and an edge connecting the first and second nodes can represent a "is coupled with" relation to indicate a potential coupling of a router and a load balancer in a computer system. Each node can have one or more common attributes or attributes specific to the device class represented by the node, such as the number of ports for a node representing a switch, or the number of CPUs for a node that represents a personal computer. The attributes can include inherent attributes having static values or dynamic attributes to take on possibly changing values or only values at run time. The dynamic attributes are given values only in an instance of the node corresponding to a computer system. Each edge can also have one or more attributes. One common attribute is the name of the relation being represented, and another common attribute is a weight, which could indicate a strength of confidence score for the relation.

In some embodiments, the server is programmed to manage a collection of issue resolution rules. Each issue resolution rule maps a set of states of computer devices (device states) characterizing a known issue to a known resolution of the issue. For example, one issue resolution rule can indicate that when a computer system that incorporates a router and a load balancer distributes work unevenly to multiple workers, that the router has a CPU utilization rate of 95%, reset the router. In this example, the distributing work unevenly to multiple workers or even an underlying cause of excessive runaway processes in the router corresponds to a known issue, the CPU utilization rate of the router corresponds to the state of a computer device that can be linked to an attribute of a node, and the resetting the router corresponds to a known resolution of the known issue.

In some embodiments, the server is programmed to receive a support bundle including configurations, logs, and other data related to a target computer system that has encountered an unknown issue. The server is programmed to extract device states from support bundle and determine which of the collection of issue resolution rules might apply based on the KG. The use of the KG may increase the coverage of the support bundle and the applicability of the issue resolution rules. The server is programmed to then prepare and transmit a recommendation for the target computer system based on the known resolution of the applicable issue resolution rules.

The server offers certain technical benefits. The server offers an initial standardization of terminology in IT infrastructure that expedites downstream processing of relevant documents or user input related to computer systems. The construction of the KG includes mapping of various descriptions of device classes from raw source data to normalized attribute names of nodes and edges that enable easy data comparison and other analysis. The server also provides comprehensive support for IT infrastructure that is typically characterized by cross-vendor, cross-platform, or other complex interdependencies. The KG captures such coupling among disparate device classes and can be utilized to reveal and apply the same coupling pattern to multiple device classes despite differences in vender, platform, or another aspect. In addition, the server enables a reduction of time spent identifying potential resolutions of unknown issues and more broadly the trouble-shooting process. By maintaining a collection of issue resolution rules and systematically analyzing a support bundle for a malfunctioned computer system and matching the analysis result to one or more of the issue resolution rules, the server is able to effectively determine how to resume normal operation for the malfunctioned computer system. The server further enables an increase in the efficiency and accuracy of determining the applicability of the issue resolution rules to the support bundle. By building and analyzing the KG to determine how the support bundle may be enhanced or which issue resolution rules to add or apply, the server is able to home in on the relevant device states and the issue resolution rules for the malfunctioned computer system.

2. Example Computing Environment

Figure 1:
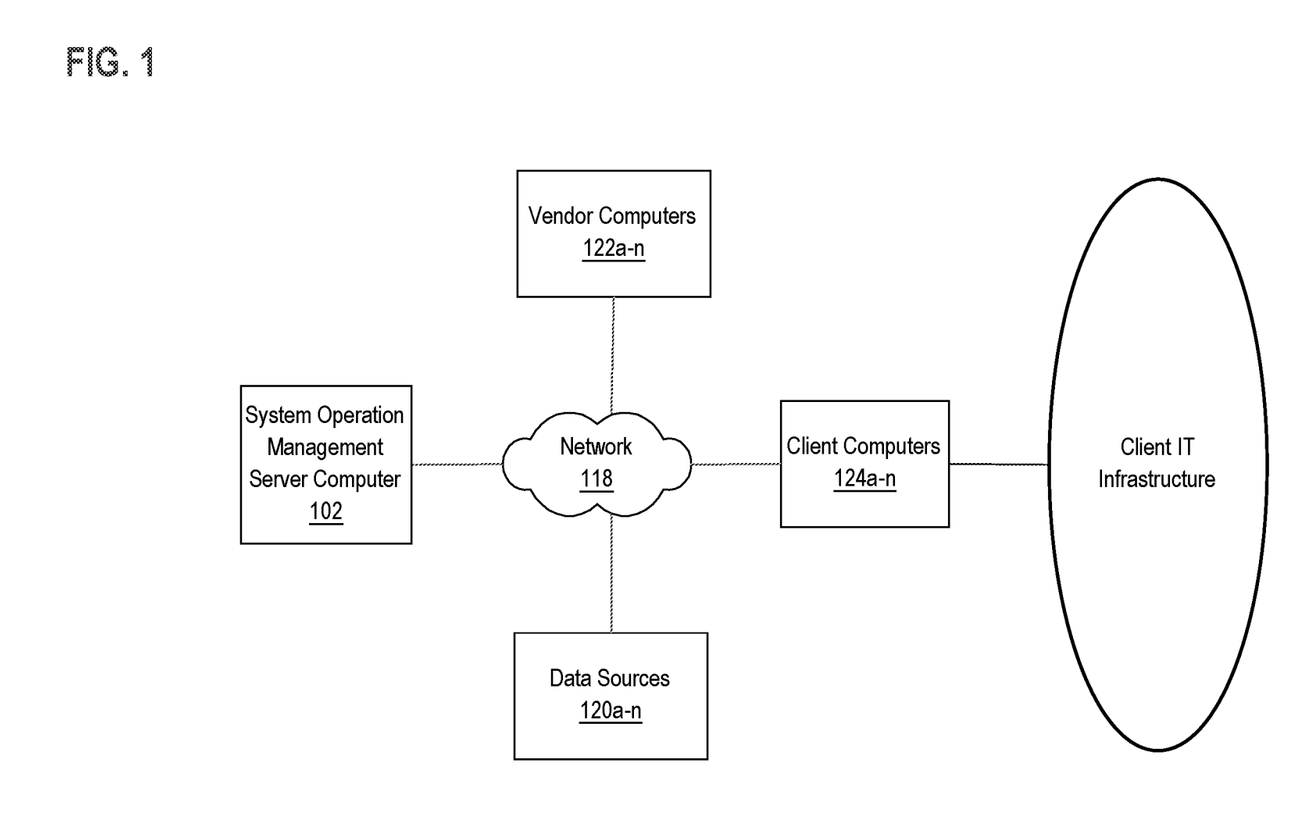
FIG. 1 illustrates an example networked computer system in which various embodiments may be practiced.

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a system operation management server computer 102 (server), one or more vendor computers 122a-n, one or more data sources 120a-n, and one or more client computers 124a-n, which are communicatively coupled directly or indirectly via one or more networks 118. Each of the one or more client computers 124a-n is coupled to a computer system with distinct IT infrastructure.

In some embodiments, the server 102 broadly represents one or more computers, virtual computing instances, and/or instances of an application that is programmed or configured with data structures and/or database records that are arranged to host or execute functions related to diagnosing and improving system operation for the computer systems coupled to the one or more client computers 124a-n. These functions can include building and maintaining the KG, managing a collection of issue resolution rules, or applying the issue resolution rules to support bundles for the computer systems. The server 102 can comprise a server farm, a cloud computing platform, a parallel computer, or any other computing facility with sufficient computing power in data processing, data storage, and network communication for the above-described functions.

In some embodiments, each of the vendor computers 122a-n represents the vendor of one or more device classes and is programmed to offer technical documentation regarding the one or more device classes, such as user manuals, technical specifications, data sheets, component templates, white papers, use case summaries, or demonstration videos. Each of the vendor computers 122a-n may have a similar hardware composition as the server 102 or may comprise a desktop computer, laptop computer, tablet computer, smartphone, wearable device, or any other type of computing device with sufficient computing power in data processing, data storage, and network communication.

In some embodiments, each of the data sources 120a-n represents an additional source of device data regarding the one or more device classes and is programmed to offer such device data. Such device data may include catalogs, advertisements, or reviews of the device classes. Each of the data sources 120a-n may have a similar hardware composition as the server 102 or may comprise a desktop computer, laptop computer, tablet computer, smartphone, wearable device, or any other type of computing device with sufficient computing power in data processing, data storage, and network communication.

In some embodiments, each of the client computers 124a-n represents a client site that hosts certain IT infrastructure and is programmed to communicate with the server 102 regarding issues that have been encountered in the certain IT infrastructure. Each of the client computers 124a-n may have a similar hardware composition as the server 102 or may comprise a desktop computer, laptop computer, tablet computer, smartphone, wearable device, or any other type of computing device with sufficient computing power in data processing, data storage, and network communication.

The networks 118 may be implemented by any medium or mechanism that provides for the exchange of data between the various elements of FIG. 1. Examples of the networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to collect device data from the one or more vendor computers 122a-n or the one or more data sources 120a-n to build a KG over IT infrastructure, which captures the features of and relations among a group of device classes. The server 102 is also programmed to maintain a database of issue resolution rules, each mapping device states of the device classes that correspond to a known issue to a known resolution of the known issue. Subsequently, the server 102 is programmed to receive a support bundle corresponding to an unknown issue from one of the client computers 124a-n associated with certain computer system that has encountered the unknown issue. The server 102 is programmed to then determine which of the issue resolution rules might apply to the support bundle based on the KG and send a recommendation to the client computer based on the known resolution of any applicable issue resolution rule.

3. Example Computer Components

Figure 2:
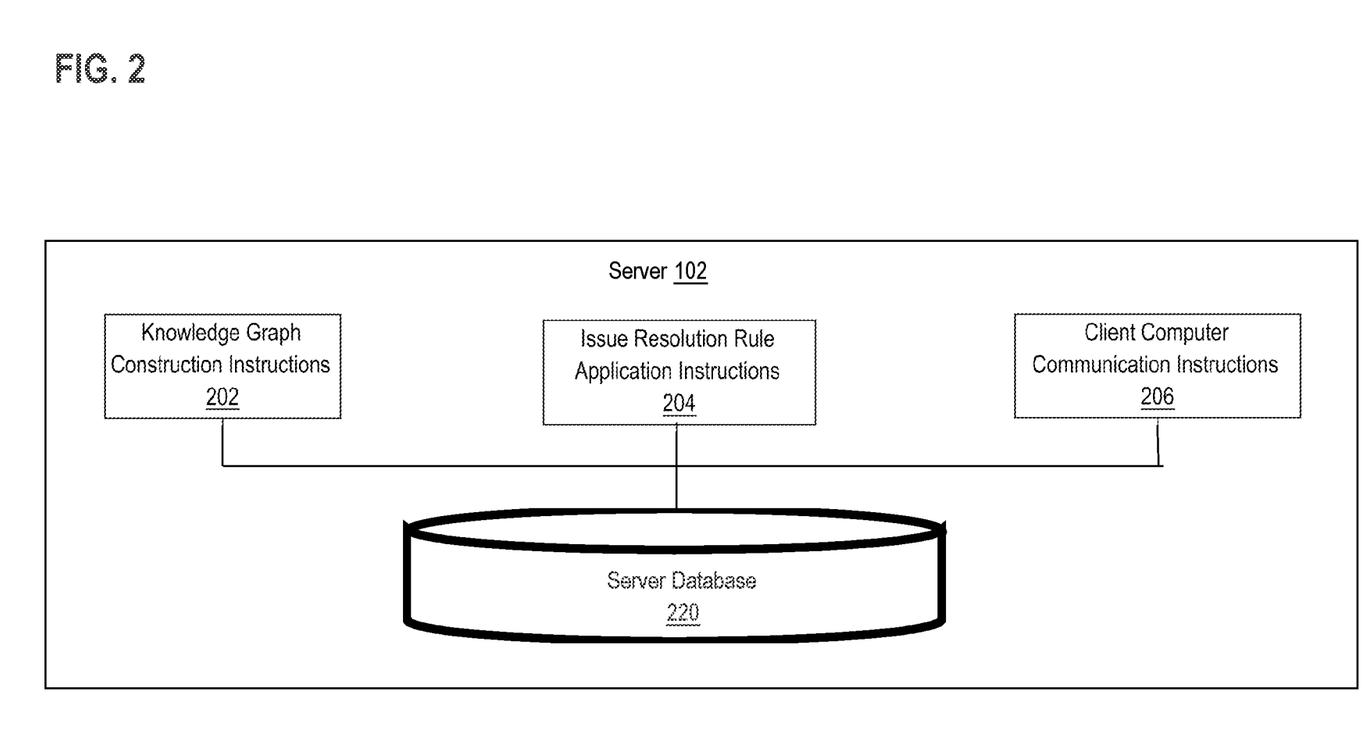
FIG. 2 illustrates example components of a system operation management server computer in accordance with the disclosed embodiments.

FIG. 2 illustrates example components of a system operation management server computer in accordance with the disclosed embodiments. FIG. 2 is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

Referring to FIG. 2, in some embodiments, the server 102 can comprise knowledge graph construction instructions 202, issue resolution rule application instructions 204, and client computer communication instructions 206. In addition, the server 102 can comprise a server database 220.

In some embodiments, the knowledge graph construction instructions 202 enable building a KG for IT infrastructure encompassing one or more device classes. The building can comprise collecting device data regarding the one or more device classes from multiple sources, learning the features of and relations among the device classes, and storing the learned features and relations in specific data structures that enable streamlining the processing of certain queries regarding the device classes.

In some embodiments, the issue resolution rule application instructions 204 enable applying issue resolution rules to a support bundle corresponding to an unknown issue encountered by a computer system. The applying can comprise determining which issue resolution rules might apply to the support bundle and preparing a recommendation for resolving the unknown issue based on the applicable issue resolution rules. The issue resolution rule application instructions 204 can also enable creating additional issue resolution rules or enhancing the KG based on information regarding the specific IT infrastructure where the unknown issue has arisen.

In some embodiments, the client computer communication instructions 206 enable communicating with the client computers. The communication may include receiving a support bundle corresponding to an unknown issue encountered by a computer system, sending a request for more information regarding the computer system, or sending a response to the support bundle, which typically includes a recommendation for resolving the unknown issue.

In some embodiments, the server database 220 is programmed or configured to manage storage of and access to relevant data, such as definitions of nodes and edges in the KG, device data regarding one or more device classes, digital models for building the KG, the KG, the issue resolution rules, support bundles for specific computer systems, histories of applying issue resolution rules to support bundles, replies to the support bundles, etc.

4. Functional Descriptions 4.1. Building a Knowledge Graph

In some embodiments, the server 102 is programmed to build a KG for IT infrastructure. Each node in the KG generally corresponds to a device class that may be incorporated in any IT environment, such as a router or a load balancer. Each node can represent a device class at one of different levels, as further discussed below. Each node may have one or more attributes or fields. Some common fields include an id, which is a unique identifier, a name, which is an internal title, a label, which is a user-visible title, a platform or operating system running on the computer device, a build version of the operating system, or a URL, which points to official or authoritative information regarding the device class. Additional common fields include an IP address, subnet information, or virtual LAN (VLAN) information. A field can also correspond to a configurable parameter that has variable values or an internal variable whose value is determined at run time.

In some embodiments, each directed edge in the KG that connects two nodes representing two device classes represents a certain relation between the two device classes. Examples of a relation include "is coupled with", which corresponds to a coupling via a physical component or a communication network within an IT environment, or "is variant of", which typically indicates a proximity in function except for a few features. For example, the switch Nexus 3524 and the switch 3524x by Cisco are considered as variants. Another example of a relation is "is substitute for", which maybe be used for two device classes having similar features but made by different vendors. Based on the "is coupled with" relation represented by an edge, for example, the KG may include several connected components (regardless of the direction of each edge) that each correspond to a set of device classes instances of which are likely to be coupled together and be part of the same computer system. Each directed edge in the KG can have a weight that represents the strength of or the confidence score for the represented relation. For example, the weight of an edge representing the "is coupled with" relation that connects two nodes representing two device classes can indicate how compatible the two device classes are, how often it is that instances of the two device classes are coupled together in a computer system, or how heavily the operation of one of the two instances depends on the operation of the other.

In some embodiments, a hierarchical structure can be imposed upon the nodes in the KG through the edges. For example, there can be a node representing a product type of a switch, which can be connected through an edge representing the "has family of" relation to a node representing a certain family within the product type, which can be connected through an edge representing the "has series of" relation to a node representing a certain series within the family, which can be connected through an edge representing the "has model of" relation to a node representing a certain model within the series, which altogether corresponds to a hierarchy of four levels of product type, family, series, and model. More broadly, a first node that represents a device class at a higher level of the hierarchy can be connected to a second node via an edge that represents the "is parent of" relation and an edge that represents the "is child of" relation in the reverse direction.

Figure 3:
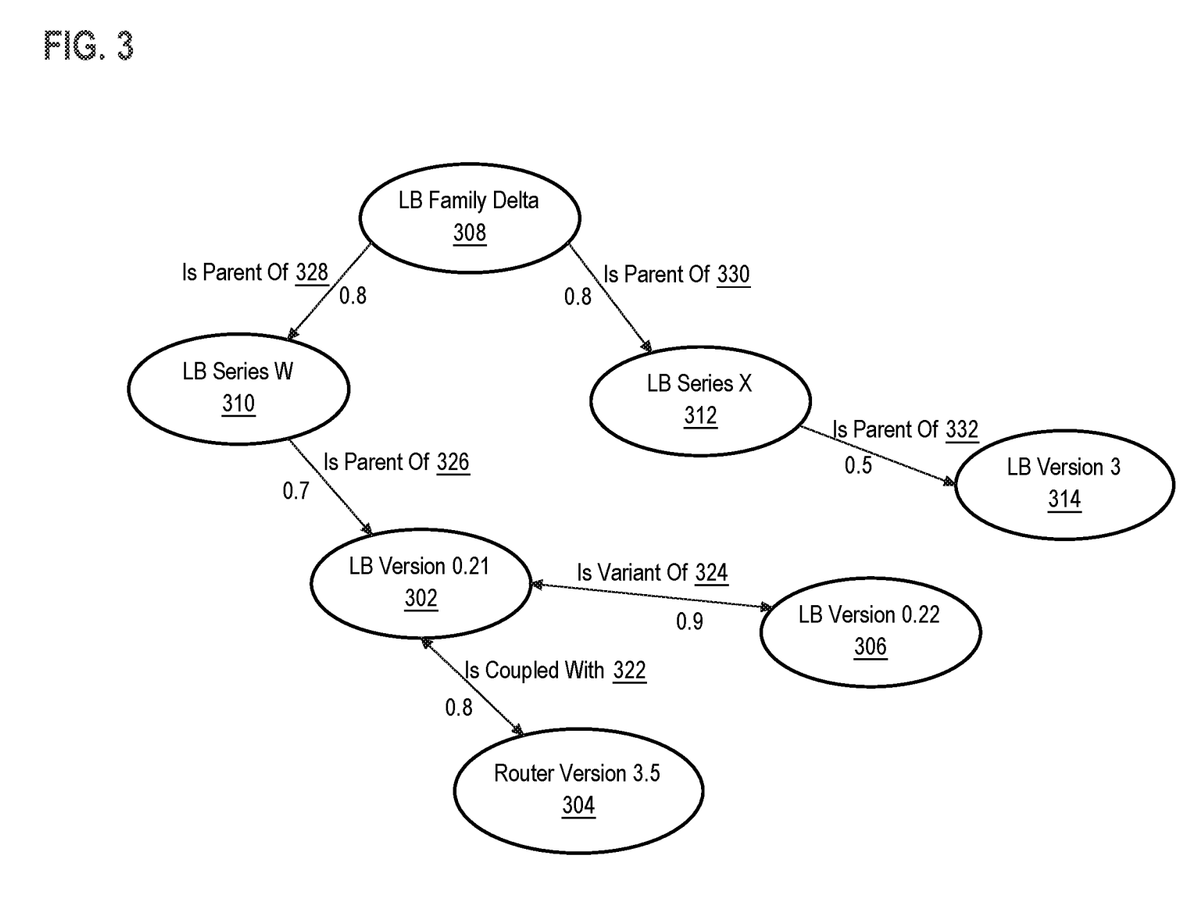
FIG. 3 illustrates an example knowledge graph.

FIG. 3 illustrates an example knowledge graph. In one embodiment, the KG represents certain IT infrastructure comprising a hierarchy of load balancer classes and a router class that is generally connected to one of the load balancer classes. Specifically, the hierarchy starts with a load balancer family, which comprises multiple load balancer series. Each load balancer series then comprises one or more load balancer versions, with some being variants of one another. Therefore, the node 308 represents a load balancer in family Delta, which is connected to the node 310 via the edge 328 that represents the "is parent of" relation for a weight of 0.8. Each edge that represents the "is parent of" relation can be accompanied by an edge that represents the "is child of" relation in the opposite direction but for the same weight. The weight associated with an edge that represents the "is parent of" relation can indicate a degree of distribution that is inversely related to the number of children, for example. The node 310 represents a load balancer in series W, which is connected to the node 302 via the edge 326 that represents the "is parent of" relation for a weight of 0.7. The node 302 represents a load balancer version 0.21, which is connected to the node 304 via the edge 332 that represents the "is coupled with" relation for a weight of 0.8. The weight associated with an edge that represents the "is coupled with" relation can indicate a frequency in which such a coupling occurs over a group of computer systems, for example. The node 304 represents a router version 3.5. The node 302 is also connected to the node 306 via the edge 324 that represents the "is variant of" relation for a weight of 0.9. The weight associated with an edge that represents the "is variant of" relation can indicate a functional similarity between the two variants, for example. The node 306 represents a load balancer version 0.22. In addition, the node 308 is connected to the node 312 via the edge 330 that represents the "is parent of" relation for a weight of 0.8. The node 312 represents a load balancer in series X, which is connected to the node 314 via the edge 332 that represents the "is parent of" relation for a weight of 0.5. The node 314 represents a load balancer version 3.

In some embodiments, the KG can support various queries. Based on the edges that represent the "is parent of" or "is child of" relations, a hierarchy of device classes can be obtained from the KG. Similarly, based on the edges that represent the "is variant of" relations, a collection of devices classes that are variants of one another can be obtained from the KG. Based on the edges that represent the "is coupled with" relations, a group of device classes the instances of which may be components of an interconnected computer system can be obtained from the KG. The field or attribute values of each node or each edge (e.g., name, weight) can also be obtained from the KG through simple queries. For further example, a new version of a switch may have fewer ports and is no longer compatible with an output device compared to the original version. Therefore, the change from the original version may be obtained by computing a graph difference between two portions of the KG corresponding to the two versions of the switch that includes a change in the value of the "number of ports" attribute of a node and an elimination of the edge representing the "is coupled with" relation with the node representing the output device.

In some embodiments, the server 102 is programmed to identify a group of device classes that may be incorporated in any IT environment, such as a router or a load balancer, and build a KG for the group of device classes. The group of device classes may determine a group of vendors. The server 102 is programmed to further collect device data related to the group of device classes. Potential sources of device data include websites of device vendors or other servers maintained by device vendors, distributors, or sellers that provide an application programming interface (API). The data can include catalogs, white papers, data sheets, technical specifications, user guides or manuals, advertisements, or reviews. Another potential source of device data is from expert users.

In some embodiments, the server 102 is programmed to extract items from the device data that may correspond to the nodes or the attributes thereof in the KG. The extraction can be based on an n-gram analysis to take context into consideration or based on other similar methods known to someone skilled in the art. For example, the official name of a device class might be a single word that occurs frequently in the device data and can be used as the value for the "label" attribute of the node that represents the product, as noted above, while the term of "IP address" or "number of ports" is a combination of words that also occurs frequently in the device data and can be used to create a new attribute of the node that represents the device class.

In some embodiments, the server 102 is programmed to further identify items from the device data that may correspond to the nodes or the attributes thereof in the KG. The identification can be based on named-entity recognition (NER) with statistical modeling, such as conditional random fields (CRF), to further take context into consideration or based on other similar methods known to someone skilled in the art, in conjunction with or separately from the n-gram analysis. The server 102 can be programmed to define domain-specific entities, such as product names, versions, technology-related terms (e.g., IP, network, packet), persons, locations, and organizations. For example, from the sentence of "Cisco 2900 series routers have a removable cover", the name of a device class consisting of four tokens "Cisco 2900 series routers" can be detected and classified based on the presence of the keyword "Cisco" or "router". The output of the NER technique may include a confidence score for a determined entity, which may be encoded in the KG as an attribute of a node or an edge and used to rank the nodes or edges. As nodes and edges are created in the KG and specific instances of the KG are built from computer systems, as further discussed below, related or additional entities can be identified and the KG can be expanded.

In some embodiments, the server is programmed to preprocess the input into NER for coreference resolution. Certain text (e.g., questions on technical forums) tends to include significant detail, and an item mentioned in one part of the text may be referred to in other parts using pronouns (e.g., it, them, this, etc.) or variant forms (e.g., abbreviations, etc.). Input to the NER or SPO, as further discussed below, can be pre-processed to convert such pronouns to proper references of specific items. In addition, the server 102 is programmed to post-process the output from NER for canonicalization. A particular item (e.g., Catalyst 9000) can be referenced in many ways in text (e.g., "Catalyst 9K", "Cat9k", "cat9k", etc.). The NER output can be fed into a duplicate detection model where variant forms of referring to the same item can be mapped into a single entity. One of the forms can be chosen as the canonical form corresponding to an official name of a node or edge in the KG, while the variants can each be marked as an alias of the node or the edge. The set of the official name and aliases can be useful for handling the variant forms that continue to occur in additional data to be matched against the KG.

In some embodiments, the server 102 is programmed to identify items from the device data that may correspond to the edges or the attributes thereof in the KG. The identification can be based on the subject-predicate-object (SPO triplet) extraction or based on other similar methods known to someone skilled in the art, in conjunction with or separately from the n-gram analysis or NER. For example, from the sentence "The APIC that implements routing within the Cisco ACI fabric performs network stitching between Leaf and the NetScaler device by Citrix based on the deployed service graph", "The APIC that implements routing within the Cisco ACI fabric" might be extracted as the subject, "performs network stitching" might be extracted as the predicate, and "the Citrix NetScaler device" might be extracted as the object. Therefore, a relation of "is coupled with" can be detected between a router by Cisco that supports the ACI fabric, such as a NEXUS 9300 series switch or a NEXUS 9500 series switch, and a NETSCALER, which has the capability for a load balancer. For further example, from the sentence "The Cisco Catalyst 9200 Series is well-suited for enterprises looking to migrate from their existing Cisco Catalyst 2960-X Series deployment", "Cisco Catalyst 2960-X Series deployments" might be extracted as the subject, "migrate to" might be extracted as the predicate, and "Cisco Catalyst 9200 Series" might be extracted as the subject. Therefore, a relation of "has migration path" can be detected between the two series of Catalyst switches by Cisco.

In some embodiments, the server 102 is programmed to determine where relations should apply and thus where edges should be established within the KG. In the example above, the subject corresponds to a device class at the level of all devices that support the ACI fabric. An edge that represents the "is coupled with" relation can therefore be attached to a node that represents the 9300-EX platform, a node that represents the 9300 series (at a higher level), or a node that represents the 9000 family (at an even higher level) assuming that the entire 9000 family support the ACI fabric. Establishing the edges at all relevant levels might take more time offline or in the background. However, doing so might save some time at runtime from tracing the edges in the KG that represent hierarchical relations, such as the edges that represent the "is parent of" or the "is child of" relation, to determine which computing devices in a computer system might be causing issues, as further discussed below.

In some embodiments, the server 102 is programmed to determine a weight for an edge in the KG. The definition of an edge may depend on the relation represented by the edge. For an edge that represents the "is parent of" relation, the weight may indicate a degree of distribution that is inversely related to the number of children. Therefore, such a weight can be automatically computed based on the structure of the KG. For an edge that represents the "is coupled with" relation, the weight may indicate a frequency of coupling over a group of computer systems. Therefore, such a weight may be computed from a group of support bundles for certain computer systems. For an edge that represents the "is variant of" relation, the weight may indicate a functional similarity between the two variants. Therefore, such as weight may be computed from the same device data by extracting and analyzing the feature differences.

4.2. Accessing Issue Resolution Rules

In some embodiments, the server 102 is programmed to build or receive a set of issue resolution rules. An issue resolution rule generally maps a list of device states of a computer system that correspond to a known issue (an abnormality or a failure) encountered by the computer system to a resolution of the known issue, which then generally involves altering one of more of the device states. Through the device states, where the computer devices in the computer system or the corresponding device classes are represented as nodes and the device states correspond to the attributes of the nodes or the edges in the KG taking on specific values, the issue resolution rule can be tied to the KG. In addition to linking each device state included in the issue resolution rule to an attribute of a node or an edge, the server 102 can be configured to add one or more attributes to each node representing a device class where a related device state is included in the issue resolution rule. For example, when the issue resolution rule includes the condition that an adapter has the "network communication capability" of supporting 10 GbE, the server 102 can be configured to link the device state or specifically the condition in the issue resolution rule to the attribute for "network communication capability" of a node representing an adapter, or update the value of an existing or a new attribute of the node for "rules" to a combination of the index of the issue resolution rule and an identifier of the "network communication capability" attribute.

In some embodiments, an issue resolution rule is to be applied to a support bundle for a computer system, as further discussed below. The support bundle contains static informational or dynamic operational data regarding the computer system over a period of time, typically up to the point when an unknown issue is encountered, to be used for system support purposes. The support bundle typically includes one or more profiles or configurations of the computer system that provide the static information data and logs or traces of the computer system that provide the dynamic operational data.

FIG. 4 illustrates an example issue resolution rule. In this example, "this" represents a support bundle or the corresponding computer system. The issue resolution rule checks various device states that correspond to a known issue, in this case BUG-1234, and provides a resolution for the known issue. For a determination of an occurrence of BUG-1234, the support bundle needs to show that the computer system satisfies the conditions 402 and 404 that certain computer devices by Citrix are present to support the platform that represents a virtual appliance based on Citrix® HDX, the condition 406 that an adapter is present to support 10 GbE, the condition 408 that at least some components support the network communication features of SSL, HTTP2, IPsec, and IPv6, the condition 410 that the version of a certain computer device or the entire computer system (which could also be represented as a node in the KG) is 2.1, and the condition 412 that the build of the certain computer device or the entire computer system is 5.24. When the support bundle shows that the computer system satisfies all these conditions, the support bundle receives a declaration 414 that the bug BUG1234 has occurred in the computer system and a link to a recommended resolution 416, namely upgrading certain computer device or the entire computer system to a new version of 2.1.6+. Therefore, upon receiving a support bundle for a computer system that has encountered an unknown issue, the server 102 can be programmed to apply such an issue resolution rule and identify a potential occurrence of a known issue and quickly offer a potential resolution for the unknown issue.

4.3. Analyzing New Support Bundles

In some embodiments, the server 102 is programmed to receive a support bundle for a target computer system that has encountered an unknown issue. The support bundle, including any profile, configuration, log, or trace related to the target computer system, could be analyzed in a similar manner as the device data is analyzed for constructing the KG, as described in Section 4.1. Specifically, the server 102 can be programmed to extract device states from the support bundle that may correspond to vertices or edges of the KG using n-gram analysis, NER, SPO triplet extraction, or other related techniques. A specific instance of the KG can be built for the target computer system from the support bundle, and the specific instance is called an asset graph (AG). For example, the entry "add vlan vlanABC 10.1.0.0/16" in a support bundle for a target computer system under a router section can be first converted to separate components of "add" for operation, "vlan" for resource, "vlanABC" for VLAN name, and "10.1.0.0/16" for subnet. The components can then be mapped to certain nodes or vertices in the KG, namely a node that represents a router, an edge that represents the "is coupled with" relation, an attribute of the edge that corresponds to the name of the VLAN, and an attribute of the edge that corresponds to the subset. Another entry "connect port 10 to vlan vlanABC" in the support bundle under the switch section can lead to a node that represents a switch and an edge connected to that edge. The AG could generally be built for a computer system as soon as information regarding the computer system is available. The AG can be expanded as more support bundles for the target computer system are received. Information regarding an AG or a corresponding support bundle can be used to enhance the KG, as noted above, or the issue resolution rules, as further discussed below.

In some embodiments, the server 102 is programmed to determine which issue resolution rules to apply. For each of the device states extracted from the support bundle, the server 102 can be programmed to determine whether any issue resolution rule refers to the device state or any equivalent or compatible device state and thus whether the issue resolution rule is potentially applicable. For each of the set of issue resolution rules identified in this manner, the server 102 can be programmed to further determine whether the issue resolution rule fully applies to the support bundle. Alternatively, for each of the set of issue resolution rules, the server 102 can be programmed to determine whether the issue resolution rule refers to one or more device states extracted from the support bundle. As another alternative, from the set of device classes whose device states extracted from the support bundle, the server 102 can be configured to identify the set of nodes in the KG that represent those device classes and the corresponding connected components of the KG and consider only those issue resolution rules that are associated with the nodes in these connected components. In general, the server 102 can be programmed to perform bipartite matching between the set of device classes extracted from the support bundle and the set of device classes represented by the nodes in one of those connected components within the KG and determine whether critical device states are missing from the support bundles, as further discussed below. To further minimize the number of issue resolution rules for consideration, the server 102 can be programmed to include only those edges that represent the "is coupled with" relation or one or more specific types of relations with weights above a certain threshold and consider only those issue resolution rules that are associated with the nodes in the resulting subset of the KG in terms of applicability to the support bundle.

In some embodiments, the server 102 is programmed to obtain more information regarding the target computer system to which the support bundle pertains to improve the applicability of issue resolution rules. Each issue resolution rule identified as being potentially applicable may refer to device states that are not extracted from the support bundle. For example, the issue resolution rule may refer to the "network communication capability" of an adapter. One reason why this device state may be missing from the support bundle could be that the adapter is not part of the target computer system, in which case the issue resolution does not actually apply. Another reason could be that the network communication capability of the adapter is not recorded in the support bundle, in which case the server 102 can be configured to send a request to obtain this information to be able to further determine whether the issue resolution rule applies.

In some embodiments, an issue resolution rule identified as being potential applicable may refer to a first device state of a first device class represented by a first node and a second device state of a second device class represented by a second node that are connected through an edge representing the "is coupled with" relation in the KG. When the support bundle incorporates the first device state but not the second device state, the server 102 can be programmed to send a request to determine whether an instance of the second device class is actually part of the target computer system and furthermore whether the issue resolution rule fully applies. When one or more issue resolution rules point to multiple device classes that may be part of the computer system, the server 102 can be programmed to send a request to choose one or more of the multiple device classes before identifying specific instances. Furthermore, when the support bundle incorporates the first device state and the second device state but does not show that instances of the two device classes are coupled together in the target computer system, the server 102 can be programmed to similarly send a request to determine whether the coupling is present in the target computer system and furthermore whether the issue resolution rule applies. For example, with respect to the KG illustrated in FIG. 3, an issue resolution rule might refer to a router version 3.5 represented by the node 304 and a load balancer version 0.21 represented by the node 302. As the node 302 and the node 304 are connected by the edge 322 that represents the "is coupled with" relation with a frequency of 80% that is above a specific threshold, the server 102 can be programmed to send a request to confirm that an instance of the load balancer version 0.21 and an instance of the router version 3.5 are coupled together in the target computer system. Specifically, when the support bundle incorporates the device state of only one of the router version 3.5 represented by the node 304 and the load balancer version 0.21 represented by the node 302, the server 102 can be programmed to send the request to determine that an instance of the other device class is part of the target system.

In some embodiments, an issue resolution rule identified as being potentially applicable may refer to a first device state of a first device class represented by the first node and a second device state of a second device class represented by a second node that are connected through an edge representing the "is coupled with" relation in the KG. The second node may also be connected with a third node representing a third device class through an edge representing the "is variant of" relation in the KG. When the support bundle incorporates the first device state but not the second device state, the server 102 can be programmed to send a request to determine whether an instance of the third device class is actually part of the target computer system. As computer devices that are variants of each other might share an issue, upon determining that an instance of the third device class is part of the target computer system and also determining that the issue resolution rule otherwise matches the support bundle, the server 102 can be programmed to derive a new rule that refers to a third device state of the third device class instead of the second device state as an alternative to traversing the edge representing the "is variant of" relation of the KG next time. For example, with respect to the KG illustrated in FIG. 3, an issue resolution rule might refer to a router version 3.5 represented by the node 304 and a load balancer version 0.21 represented by the node 302. As the node 306 that represents the load balancer version 0.22 is also connected to the node 302 through the edge 312 that represents a "is variant of" relation with a strength of 0.9 (indicating how functionally or physically related the two variants are) that is above a specific threshold, the server 102 can be programmed to send a request to confirm that an instance of the load balancer version 0.22 and an instance of the router version 3.5 are coupled together in the target computer system and derive a new issue resolution rule that refers to a router version 3.5 represented by the node 304 and the load balancer version 0.22 represented by the node 306. Specifically, when the support bundle incorporates the device state of a router version 3.5 represented by the node 304 but not the device state of the load balancer version 0.21 represented by the node 302, the server 102 can be programmed to send the request to determine whether an instance of the load balancer version 0.22 represented by the node 306 is present in the target computer system. In general, for a device state of a first device class extracted from support bundle, the server 102 can be configured to determine whether any issue resolution rule refers to a second device class that is a variant of the first device class by tracing an edge that represents the "is variant of" relation in the KG.

In some embodiments, an issue resolution rule identified as being potentially applicable may refer to a first device state of a first device class represented by the first node and a second device state of a second device class represented by a second node that are connected through an edge representing the "is coupled with" relation in the KG. The second node is also connected to a third node representing a third device class through an edge representing the "is child of" relation in the KG. The third node is also connected to a fourth node representing a fourth device class through an edge representing the "is parent of" relation. The second node and the fourth node are then implicitly in a "is sibling of" relation. When the support bundle incorporates the first device state but not the second device state, the server 102 can be programmed to send a request to determine whether an instance of the fourth device class is part of the target computer system. As the computer devices represented by these sibling nodes, such as computer devices that belong to different product types, families, or series, may share an issue, upon determining that an instance of the fourth device class is part of the target computer system and also determining that the issue resolution rule otherwise matches the support bundle, the server 102 can be programmed to derive a new rule that refers to the fourth device state instead of the second device state as an alternative to traversing the "is child of" and "is parent of" edges of the KG next time. For example, with respect to the KG illustrated in FIG. 3, an issue resolution rule might refer to the router version 3.5 represented by the node 304 and a load balancer version 0.21 represented by the node 302 or a load balancer series W represented by the node 310. The node 310 and the node 312 are siblings that are connected through the edge 328 and the edge 330 each for a weight of 0.8 that is above some threshold. The weight can be calculated as a degree of distribution from the parent node 308 that is inversely related to the number of children of the parent node 308. The same weight can be assigned to every edge representing an "is parent of" or "is child of" relations connected to the same parent node 308 to generally reflect the amount of variation among the children. Therefore, when the support bundle incorporates the device state of a router version 3.5 represented by the node 304, the server 102 can be programmed to send a request to confirm that an instance of the load balancer series X represented by the node 312 is present in the target computer system and derive a new issue resolution rule that refers to a router version 3.5 represented by the node 304 and the load balancer series X represented by the node 312. The request can similarly confirm that an instance of a load balancer version 3 represented by the node 314 is present in the target computer system depending on the degree of distribution associated with the node 312.

In some embodiments, the server 102 is programmed to further focus on the relations among the device states referred to in an issue resolution or the corresponding attributes of or the edges connecting the nodes representing the device classes of those device states. For example, an issue resolution rule may refer to a certain attribute of a switch by Cisco having a relatively large value and a specific attribute of a load balancer by Citrix having a relatively small value, while the two nodes representing the switch by Cisco and the load balancer by Citrix are connected by an edge representing the "is coupled with" relation. The support bundle for a target computer system might indicate the certain attribute of a switch having a relatively large value and the specific attribute of a load balancer having a relatively small value while the switch and the load balancer are made by different vendors from Cisco and Citrix in the target computer system. When the issue resolution rule includes a resolution of adjusting the value of a particular attribute of the switch, the server 102 can be programmed to apply the issue resolution rule to the support bundle and specifically also recommend adjusting the value of the particular attribute of the switch in the target computer system. Furthermore, the server 102 can be programmed to create a new issue resolution rule that refers to the device states of the vendor-specific device classes instances of which are part of the target computer system. Over time, the server 102 can also be programmed to create a new issue resolution rule that refers to the device states of higher-level device class that include the various vendor-specific device classes.

In some embodiments, the server 102 is programmed to prepare a recommendation for resolving the unknown issue encountered by the target computer system based on the applicable issue resolution rules. The server 102 can combine the known resolutions in these issue resolution rules in various ways. These issue resolution rules can be ranked based on the extent of applicability to the support bundle. For example, an exact match of the device states referred to in an issue resolution rule may ranked higher than a match that requires expanding the scope of the issue resolution rule via various attributes of or edges connecting the nodes in the KG, as noted above. The server 102 can be configured to include only the known resolutions from a number of highest-ranking issue resolution rules in the recommendation. The resolutions from different issue resolution rules are in conflict. For example, one known resolution might require changing the maximum number of open sessions of an output device from ten to twenty, while another might require changing the maximum number to five or uncoupling the output device. The server 102 can be configured to present a list of choices for user selection or similarly rank the resolutions based on how well the corresponding issue resolution rules match the support bundle.

5. Example Processes

Figure 5:
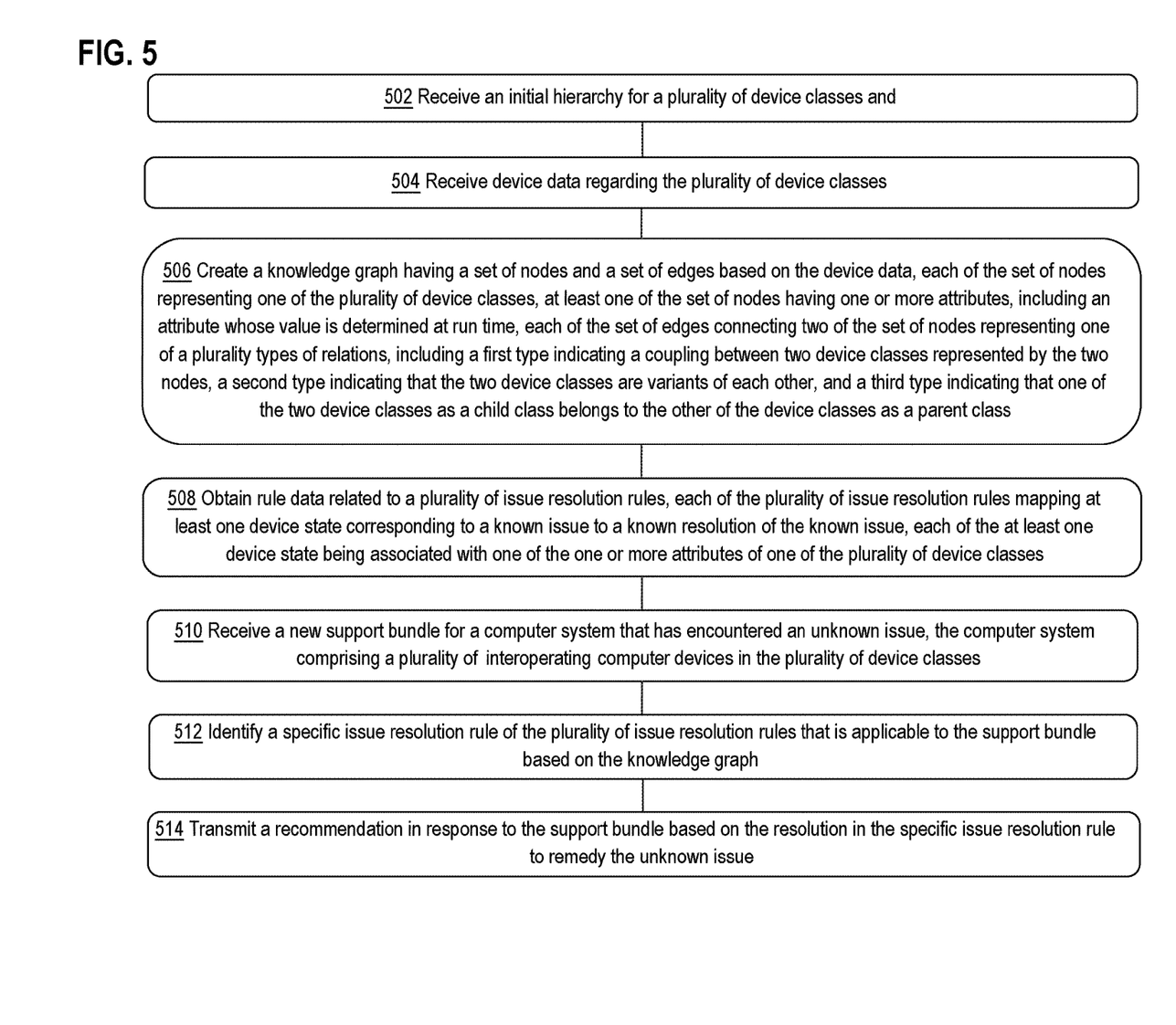
FIG. 5 illustrates an example process performed by the system operation management server computer of organizing infrastructure data and resolving infrastructure issues.

FIG. 5 illustrates an example process performed by the system operation management server computer of organizing infrastructure data and resolving infrastructure issues. FIG. 5 is shown in simplified, schematic format for purposes of illustrating a clear example and other embodiments may include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 502, the server 102 is programmed or configured to receive an initial hierarchy for a plurality of device classes.

In some embodiments, in step 504, the server 102 is programmed or configured to receive device data regarding the plurality of device classes. In certain embodiments, a first device class of the plurality of device classes corresponds to a product type, a second device class of the plurality of device classes corresponds to a family that belongs to the product type, and a third device class of the plurality of device classes corresponds to a series that belongs to the family.

In some embodiments, in step 506, the server 102 is programmed or configured to create a knowledge graph having a set of nodes and a set of edges based on the device data. Each of the set of nodes represents one of the plurality of device classes. At least one of the set of nodes has one or more attributes, including an attribute whose value is determined at run time. The one or more attributes of the node can further include a platform or operating system running on the device class, a build version of the operating system, or a configurable parameter of the device class. Each of the set of edges connecting two of the set of nodes represents one of a plurality types of relations, including a first type indicating a coupling between two device classes represented by the two nodes, a second type indicating that the two device classes are variants of each other, and a third type indicating that one of the two device classes as a child class belongs to the other of the device classes as a parent class.

In some embodiments, the server 102 can be configured to extracting information from the device data that corresponds to a node, an attribute of a node, a value of an attribute of a node, an attribute of an edge, a value of an attribute of an edge using an n-gram analysis, named entity recognition, or subject-predicate-object triplet extraction.

In some embodiments, the server 102 can be configured to compute a weight for each of the set of edges. The weight can represent a frequency of coupling for an edge that represents the first type of relation. The weight can represent a functional similarity between the variants for an edge that represents the second type of relation. The weight can represent a degree of distribution of the parent class for an edge that represents the third type of relation.

In some embodiments, in step 508, the server 102 is programmed or configured to obtain rule data related to a plurality of issue resolution rules. Each of the plurality of issue resolution rules maps at least one device state corresponding to a known issue to a resolution of the known issue. Each of the at least one device state is associated with one of the one or more attributes of one of the plurality of device classes. The resolution can indicate adjusting a device state of one of the plurality of device classes or switching to a related device class, such as upgrading a computer device to a newer version.

In some embodiments, in step 510, the server 102 is programmed or configured to receive a support bundle for a computer system that has encountered an unknown issue, where the computer system comprises a plurality of interoperating computer devices. The support bundle can include one or more profiles, configurations, logs, or traces related to the computer system for a period up to when the unknown issue was encountered.

In some embodiments, in step 512, the server 102 is programmed or configured to identify a specific issue resolution rule of the plurality of issue resolution rules that is applicable to the support bundle based on the knowledge graph. Identifying the specific issue resolution rule can comprise extracting one or more device states of the plurality of computer devices from the support bundle.

In some embodiments, the server 102 is configured to identify an initial group of nodes in the knowledge graph that correspond to the one or more device states extracted from the support bundle, determine an extended group of nodes from the initial group of nodes by following edges that represent one of the plurality types of relations from the initial group of nodes, and identify a set of issue resolution rules of the plurality of issue resolution rules that are associated with the extended group of nodes, including the specific issue resolution rule.

In some embodiments, the server 102 is configured to select an issue resolution rules from the plurality of issue resolution rules that refers to a first device state of the one or more device states extracted from the support bundle, the first device state being of a first device class of the plurality of device classes. The server 102 is further configured to, when the issue resolution rule refers to a second device state of a second device class that is not extracted from the support bundle, with the first device class and the second device class being represented by two of the set of nodes connected by an edge representing a first type of relation, transmit a request for confirming a presence of an instance of the second device class in the computer system.

In some embodiments, the server 102 is configured to, for a first device state of the one or more device states extracted from the support bundle, the first device state being of a first device class represented by a first of the set of nodes, identify an issue resolution rule that does not refer to the first device state but refers to a second device class represented by a second of the set of nodes such that the first node and the second node are connected through one or more edges, including one that represents the second type of relation or the third type of relation. The server 102 can be further configured to, when the certain issue resolution rule otherwise matches the support bundle, create a new issue resolution rule that refers to the second device class.

In some embodiments, in step 514, the server 102 is programmed or configured to transmit a recommendation in response to the support bundle based on the resolution in the specific issue resolution rule to resolve the unknown issue. The recommendation can include information related to the specific issue resolution rule, including which device state is referred to by the specific issue rule, which resolution is included in the issue resolution rule, or how the issue resolution rule applies to the support bundle.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
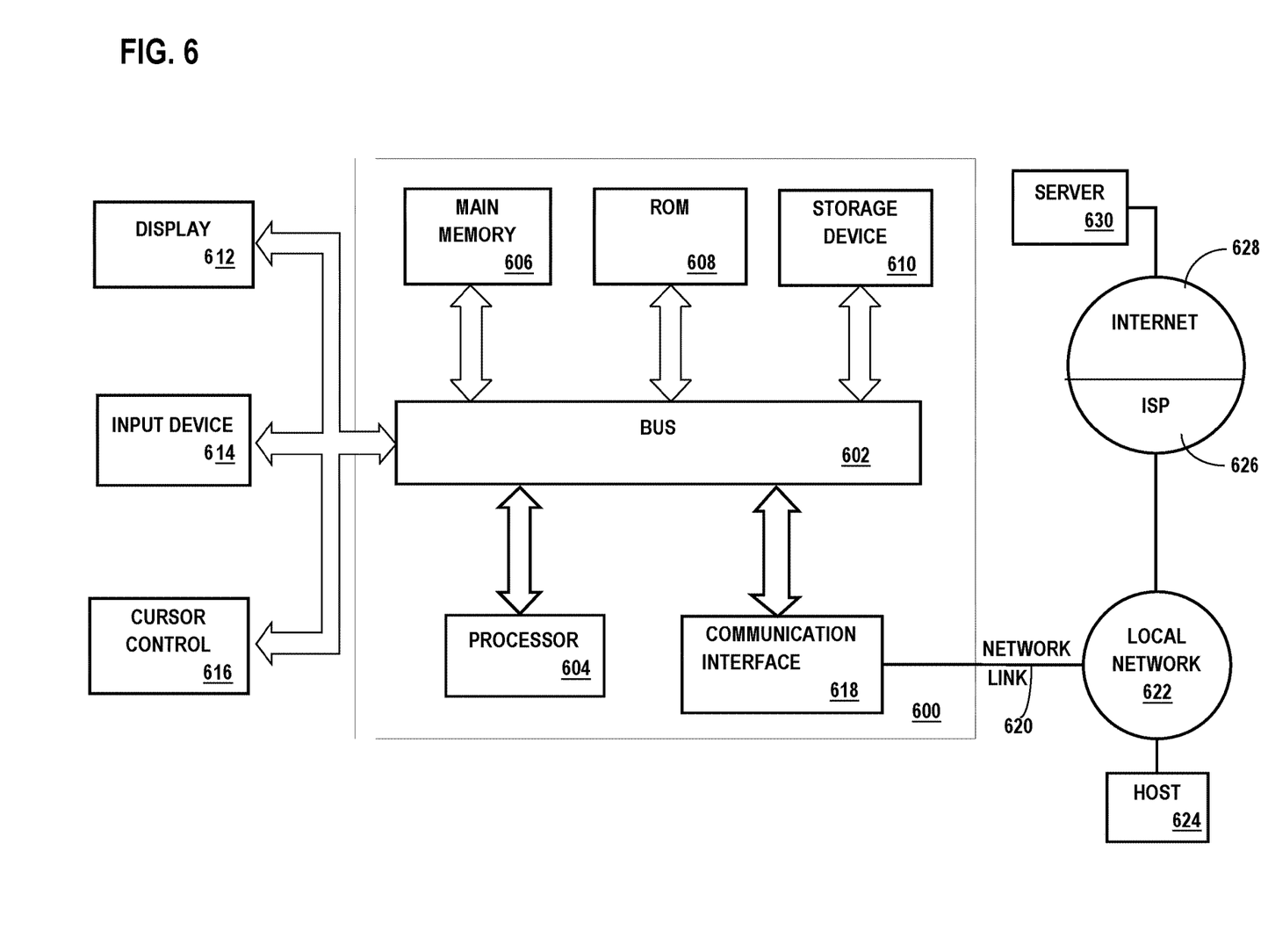
FIG. 6 is a block diagram that illustrates a computer system upon which an embodiment of the invention may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction

What is claimed is:

1. A computer implemented method of organizing infrastructure data and resolving infrastructure issues, comprising:

receiving, by a processor, an initial hierarchy for a plurality of device classes;

receiving device data regarding the plurality of device classes;

creating, by the processor, a knowledge graph having a set of nodes and a set of edges based on the device data,
  each of the set of nodes representing one of the plurality of device classes,
  at least one of the set of nodes having one or more attributes, including an attribute whose value is determined at run time of the corresponding device class,
  each of the set of edges connecting two of the set of nodes representing one of a plurality types of relations, including a first type indicating a coupling between two device classes represented by the two nodes, a second type indicating that the two device classes are variants of each other, and a third type indicating that one of the two device classes as a child class belongs to the other of the device classes as a parent class;

obtaining rule data related to a plurality of issue resolution rules,
  each of the plurality of issue resolution rules mapping at least one device state corresponding to a known issue to a resolution of the known issue,
  each of the at least one device state being associated with one of the one or more attributes of one of the plurality of device classes;

receiving a support bundle for a computer system that has encountered an unknown issue,
  the support bundle including data automatically produced by the computer system,
  the computer system comprising a plurality of interoperating computer devices in the plurality of device classes;

identifying a specific issue resolution rule of the plurality of issue resolution rules that is applicable to the support bundle based on the knowledge graph, the identifying comprising considering a node in the knowledge graph that represents a device class of which no instance is included in the computer system;

transmitting a recommendation in response to the support bundle based on the resolution in the specific issue resolution rule to resolve the unknown issue.

2. The computer-implemented method of claim 1, a first device class of the plurality of device classes corresponds to a product type, a second device class of the plurality of device classes corresponds to a family that belongs to the product type, a third device class of the plurality of device classes corresponds to a series that belongs to the family, and a fourth device class of the plurality of device classes corresponds to a model that belongs to the series.

3. The computer-implemented method of claim 1, the one or more attributes of the node further including a platform or operating system running on the device class, a build version of the operating system, or a configurable parameter of the device class.

4. The computer-implemented method of claim 1, the creating comprising extracting information from the device data that corresponds to a node, an attribute of a node, a value of an attribute of a node, an attribute of an edge, a value of an attribute of an edge using an n-gram analysis, named entity recognition, or subject-predicate-object triplet extraction.

5. The computer-implemented method of claim 1, the creating comprising computing a weight for each of the set of edges,
the weight representing a frequency of coupling for an edge that represents the first type of relation,
the weight representing a functional similarity between the variants for an edge that represents the second type of relation,
the weight representing a degree of distribution of the parent class for an edge that represents the third type of relation.

6. The computer-implemented method of claim 1, the resolution indicating adjusting a device state of one of the plurality of device classes.

7. The computer-implemented method of claim 1, the support bundle including one or more profiles, configurations, logs, or traces related to the computer system for a period up to when the unknown issue was encountered.

8. The computer-implemented method of claim 1, the identifying the specific issue resolution rule comprising extracting one or more device states of the plurality of computer devices from the support bundle.

9. The computer-implemented method of claim 8, the identifying the specific issue resolution rule comprising:
identifying an initial group of nodes in the knowledge graph that correspond to the one or more device states extracted from the support bundle;
determining an extended group of nodes from the initial group of nodes by following edges that represent one of the plurality types of relations from the initial group of nodes;
identifying a set of issue resolution rules of the plurality of issue resolution rules that are associated with the extended group of nodes, including the specific issue resolution rule.

10. The computer-implemented method of claim 8, the identifying the specific issue resolution rule comprising:
selecting an issue resolution rules from the plurality of issue resolution rules that refers to a first device state of the one or more device states extracted from the support bundle, the first device state being of a first device class of the plurality of device classes;
when the issue resolution rule refers to a second device state of a second device class that is not extracted from the support bundle, the first device class and the second device class being represented by two of the set of nodes connected by an edge representing a first type of relation, transmitting a request for confirming a presence of an instance of the second device class in the computer system.

11. The computer-implemented method of claim 8, the identifying the specific issue resolution rule comprising, for a first device state of the one or more device states extracted from the support bundle, the first device state being of a first device class represented by a first of the set of nodes, identifying an issue resolution rule that does not refer to the first device state but refers to a second device class represented by a second of the set of nodes such that the first node and the second node are connected through one or more edges, including one that represents the second type of relation or the third type of relation.

12. The computer-implemented method of 11, further comprising, when the specific issue resolution rule otherwise matches the support bundle, creating a new issue resolution rule that refers to the second device class.

13. The computer-implemented method of claim 1, the recommendation including information related to the specific issue resolution rule, including which device state is referred to by the specific issue rule, which resolution is included in the issue resolution rule, or how the issue resolution rule applies to the support bundle.

14. The computer-implemented method of claim 1, further comprising:
receiving a query that specifies two values of a particular attribute of the one or more attributes of the set of nodes;
computing a graph difference between two nodes of the set of nodes that respectively have the two values of the particular attribute;
transmitting data related to the graph difference in response to the query.

15. One or more non-transitory storage media storing instructions which, when executed by one or more computing devices, cause performance of a method of automatically configuring and managing a system, the method comprising:
receiving an initial hierarchy for a plurality of device classes;
receiving device data regarding the plurality of device classes;
creating a knowledge graph having a set of nodes and a set of edges based on the device data,
each of the set of nodes representing one of the plurality of device classes,
at least one of the set of nodes having one or more attributes, including an attribute whose value is determined at run time of the corresponding device class,
each of the set of edges connecting two of the set of nodes representing one of a plurality types of relations, including a first type indicating a coupling between two device classes represented by the two nodes, a second type indicating that the two device classes are variants of each other, and a third type indicating that one of the two device classes as a child class belongs to the other of the device classes as a parent class;
obtaining rule data related to a plurality of issue resolution rules, each of the plurality of issue resolution rules mapping at least one device state corresponding to a known issue to a resolution of the known issue, each of the at least one device state being associated with one of the one or more attributes of one of the plurality of device classes;

receiving a support bundle for a computer system that has encountered an unknown issue, the support bundle including data automatically produced by the computer system, the computer system comprising a plurality of interoperating computer devices in the plurality of device classes;

identifying a specific issue resolution rule of the plurality of issue resolution rules that is applicable to the support bundle based on the knowledge graph, the identifying comprising considering a node in the knowledge graph that represents a device class of which no instance is included in the computer system;

transmitting a recommendation in response to the support bundle based on the resolution in the specific issue resolution rule to resolve the unknown issue.

16. The one or more non-transitory storage media of claim 15, the creating comprising extracting information from the device data that corresponds to a node, an attribute of a node, a value of an attribute of a node, an attribute of an edge, a value of an attribute of an edge using an n-gram analysis, named entity recognition, or subject-predicate-object triplet extraction.

17. The one or more non-transitory storage media of claim 15, the creating comprising computing a weight for each of the set of edges, the weight representing a frequency of coupling for an edge that represents the first type of relation, the weight representing a functional similarity between the variants for an edge that represents the second type of relation, the weight representing a degree of distribution of the parent class for an edge that represents the third type of relation.

18. The one or more non-transitory storage media of claim 15, the identifying the specific issue resolution rule comprising extracting one or more device states of the plurality of computer devices from the support bundle.

19. The one or more non-transitory storage media of claim 18, the identifying the specific issue resolution rule comprising:

identifying an initial group of nodes in the knowledge graph that correspond to the one or more device states extracted from the support bundle;

determining an extended group of nodes from the initial group of nodes by following edges that represent one of the plurality types of relations from the initial group of nodes;

identifying a set of issue resolution rules of the plurality of issue resolution rules that are associated with the extended group of nodes, including the specific issue resolution rule.

20. The one or more non-transitory storage media of claim 18, the identifying the specific issue resolution rule comprising:

selecting an issue resolution rules from the plurality of issue resolution rules that refers to a first device state of the one or more device states extracted from the support bundle, the first device state being of a first device class of the plurality of device classes;

when the issue resolution rule refers to a second device state of a second device class that is not extracted from the support bundle, the first device class and the second device class being represented by two of the set of nodes connected by an edge representing a first type of relation, transmitting a request for a presence of an instance of the second device class in the computer system.

* * * * *